UNITED STATES PATENT OFFICE.

LEOPOLD OSTERMANN, OF HAMBURG, GERMANY.

PROCESS FOR THE FORMATION OF DIARYL ETHERS.

1,099,761. Specification of Letters Patent. Patented June 9, 1914.

No Drawing. Application filed May 21, 1913. Serial No. 769,054.

*To all whom it may concern:*

Be it known that I, Dr. LEOPOLD OSTERMANN, manufacturer, a subject of the German Emperor, and resident of Hamburg, Germany, have invented a new and useful Process for the Formation of Diaryl Ethers, of which the following is a specification.

Of the processes hitherto known for the formation of diaryl ethers, some are accomplished, and some take place in such manner that the simultaneous formation of by-products excessively reduces the yield and renders purification of the final product very difficult. Moreover these methods, as they chiefly require the use of expensive bromobenzene, are useless for working cheap enough for manufacturing purposes.

As is well known, in accordance with the present state of science, the substitution of the halogen atom in mono-halogen-substitution-products of aromatic hydrocarbons, by other atomic groups, such as for instance $OH$, $NH_2$, $NH.aryl$, $SH$ and the like, takes place in a smooth manner only when either the aromatic core of the halogen compounds in question contains also other substituents, or when (more particularly in non-substituted halogen hydrocarbons of the aromatic series) the work is carried out in the presence of catalyzers, such as copper or its compounds. On the contrary, and with reference to the statements in the *Berichte* 38 (1905) p. 2211 paragraphs 1 and 2, and *Annalen* 350 (1906) p. 83 paragraph 2 and following, it was impossible to foresee whether, by using the well known method for manufacturing nitro-substituted aryl ethers (compare *Ber.* 29, 1896, p. 1446/1447, *Ber.* 30, 1897, p. 739, paragraph 3 from below), it would be possible to obtain in sufficiently paying quantities simple aryl ethers from aromatic halogen hydrocarbons and dry phenolates. It has been now found that it is in fact possible to obtain from all aromatic mono-halogen hydrocarbons and dry alkali phenolates the simple aryl ethers in pure form, and with excellent yields, and this without the addition of catalyzers, by first dissolving the dry phenolate in the corresponding phenol, then mixing with this solution the halogen hydrocarbon and heating for a considerable time under pressure at temperatures of about 200° and beyond.

The preparation of the reaction mixture is carried out in such manner that, after the reaction is completed, the phenol used for the solution, is recovered by the addition of a calculated quantity of an alkali-lye, and then first any excess of the halogen hydrocarbon used, the cheapest representative of which is mainly chloro-benzene, is recovered from the reaction mixture by blowing off with steam, and finally the diaryl ether formed is distilled off or obtained by extracting with ether.

The technical advance of the process according to this invention consists in the possibility of using in the same cheap chlorobenzene with the same, or even better technical success, than if expensive bromo-benzene, as hitherto, had been used, and in that the addition of catalyzers becomes unnecessary. In this way the products can be manufactured much more cheaply than by the known processes.

In place of the chloro-benzene or other mono-chlorin-substitution products of aromatic hydro-carbons, there can be used according to the present process, with similar success, the corresponding mono-bromin and mono-iodin-substitution products, but owing to the considerably higher cost of manufacturing bromin and iodin derivatives, their use does not offer any advantages compared to the mono-chlorin derivatives.

*Examples.*

1. 470 gr. phenol are mixed with 560 gr. of 50% potash lye and deprived of water. The dry phenolate is then dissolved in 450 gr. phenol and after mixing with 1120 gr. chloro-benzene, heated in an autoclave to 200–220°. After having heated until the alkali phenolate will be decomposed by the chloro-benzene, the quantity of potash lye required for neutralizing the free phenol, is added. The unconsumed chloro-benzene and the diphenyl ether formed are then expelled by steam and the ether is obtained in a pure state by repeated distillation. In this way 711 gr. of chloro-benzene which have not entered into reaction and 622 of purest phenyl ether of melting point 28° C. and boiling point 115–116° under 7 mm. pressure, are obtained.

2. 750 gr. of m-cresol are mixed with 780 gr. 50% potash lye and deprived of water. The dry product is then dissolved in 750 gr. m-cresol and after addition of 1500 gr. chloro-benzene, heated in an autoclave to 200–220°. After having heated until the alkali cresylate will be decomposed by the chloro-benzene, the quantity of potash lye required for neutralizing the free m-cresol, is added. The unconsumed chloro-benzene and the m-cresyl phenyl ether formed are expelled by steam, the latter being obtained in pure state by repeated distillation. It shows then a boiling point of 120–121° C., at a pressure of 7 mm. In a similar manner can be obtained the o-cresyl-phenyl-ether of boiling point 120–121° C. at 7 mm. pressure and the p-cresyl-phenyl-ether of boiling point 122–123° C. at a pressure of 7 mm.

3. 250 gr. β-naphthol are mixed with 200 gr. 50% potash lye and deprived of water. The dry phenolate is dissolved hot in 250 gr. β-naphthol, and the solution introduced into 400 gr. chloro-benzene. The mixture is heated in an autoclave at 200–220°. After having heated until the alkali naphtholate will be decomposed by the chloro-benzene the quantity of potash lye required for neutralizing the free naphthol is added, mixed and the chloro-benzene-naphthyl-phenyl-ether solution taken off and subjected to fractional distillation. β-naphthyl-phenyl-ether of melting point of 46° C. is obtained in excellent yield. In the same way is obtained the λ-naphthyl-phenyl-ether of 55–56° C. melting point.

4. 250 gr. guaiacol are mixed with 226 gr. 50% potash lye and carefully deprived of water, then dissolved in 250 gr. guaiacol and introduced into 500 gr. chloro-benzene. The mixture is heated in an autoclave to 200–220°. After having heated until the alkali guaiacolate will be decomposed by the chloro-benzene, the free guaiacol is neutralized with potash lye, and the unconsumed chloro-benzene and the guaiacyl-phenyl-ether formed, are distilled off by means of steam. In fractional distillation is obtained in pure state guaiacyl-phenyl-ether boiling at 91–92° at a pressure of 7 mm.

The diaryl ethers which can be thus obtained, and of which a large number are distinguished by a powerful scent, are intended to be used as perfumes in several industries.

Having now particularly described and ascertained the nature of my said invention and in what manner the same is to be performed, I declare that what I claim is:—

1. A process for effecting the formation of diaryl ethers which consists in adding phenol to a dried phenolate of an alkali metal until solution is effected, adding a mono-halogen substitution product of one of the aromatic series of hydrocarbons, and heating under pressure.

2. A process for effecting the formation of diaryl ethers which consists in adding to a dried alkali phenolate phenol in quantities sufficient to effect solution, adding to said solution a mono-halogen substitution product of one of the aromatic series of hydrocarbons, and subjecting under pressure to prolonged treatment at a temperature of not less than 200° C.

3. A process for effecting the formation of a phenol ether which consists in adding to an alkali metal phenolate enough of the phenol to effect solution, adding to the solution chloro-benzene, subjecting to prolonged treatment under pressure at a temperature not less than 200° C., relieving the pressure, driving steam through the product to carry off the ether formed, and recovering the ether by repeated distillation.

In testimony, that I claim the foregoing as my invention, I have signed my name in presence of two witnesses, this 30th day of April 1913.

Dr. LEOPOLD OSTERMANN.

Witnesses:
ERNEST H. L. MUMMENHOFF,
IDA CHRIST. HAFERMANN.